United States Patent Office 3,375,940
Patented Apr. 2, 1968

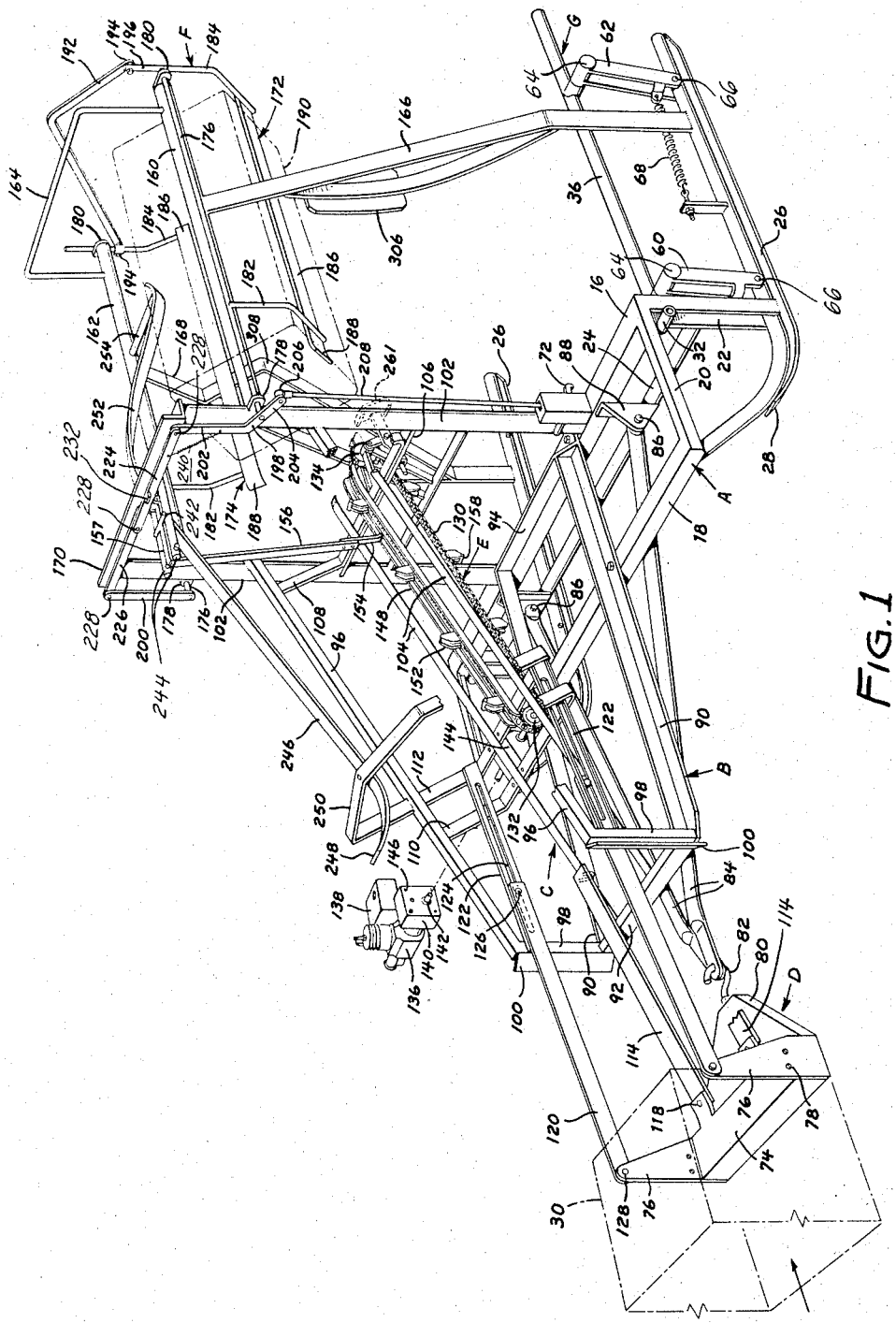

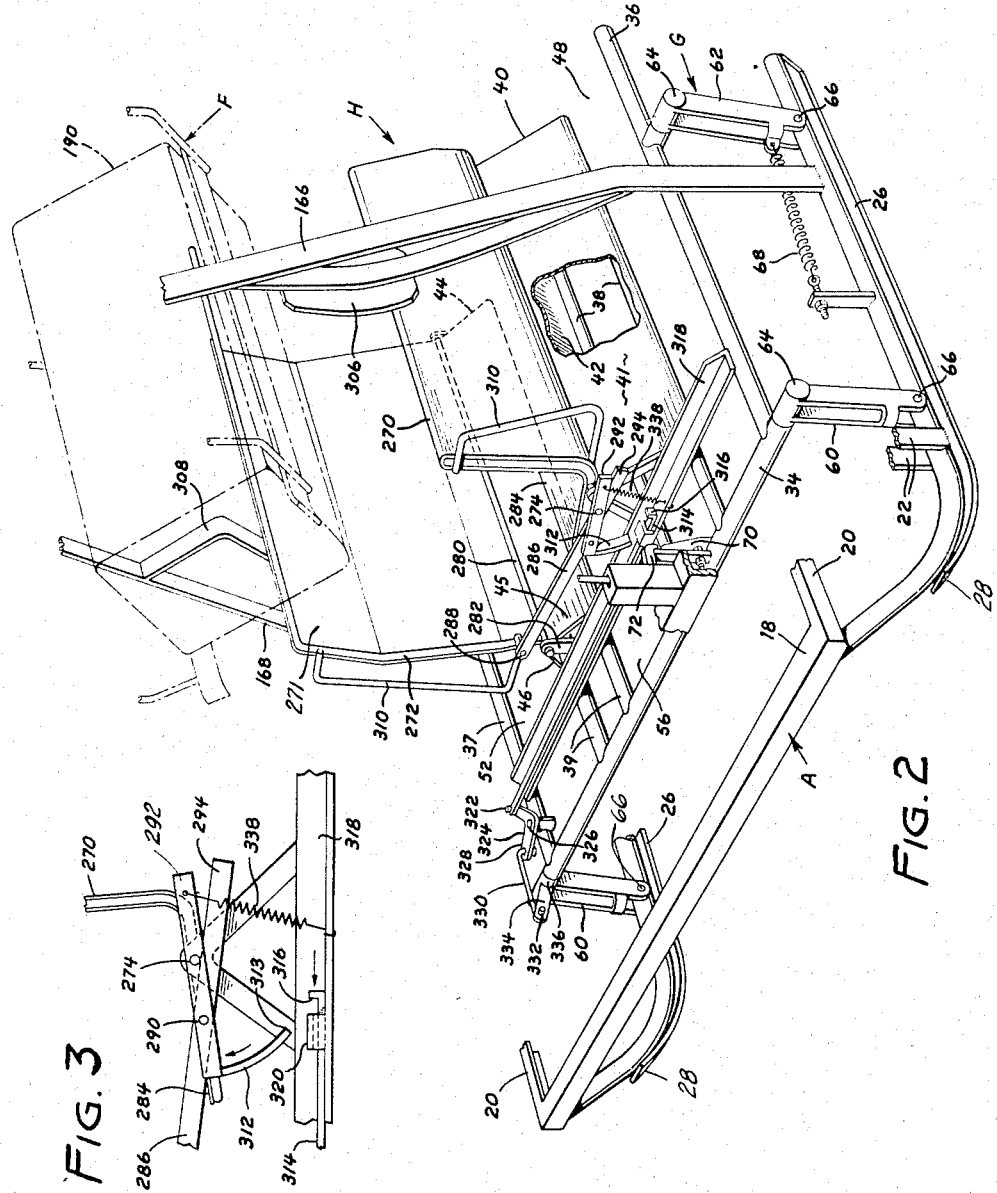

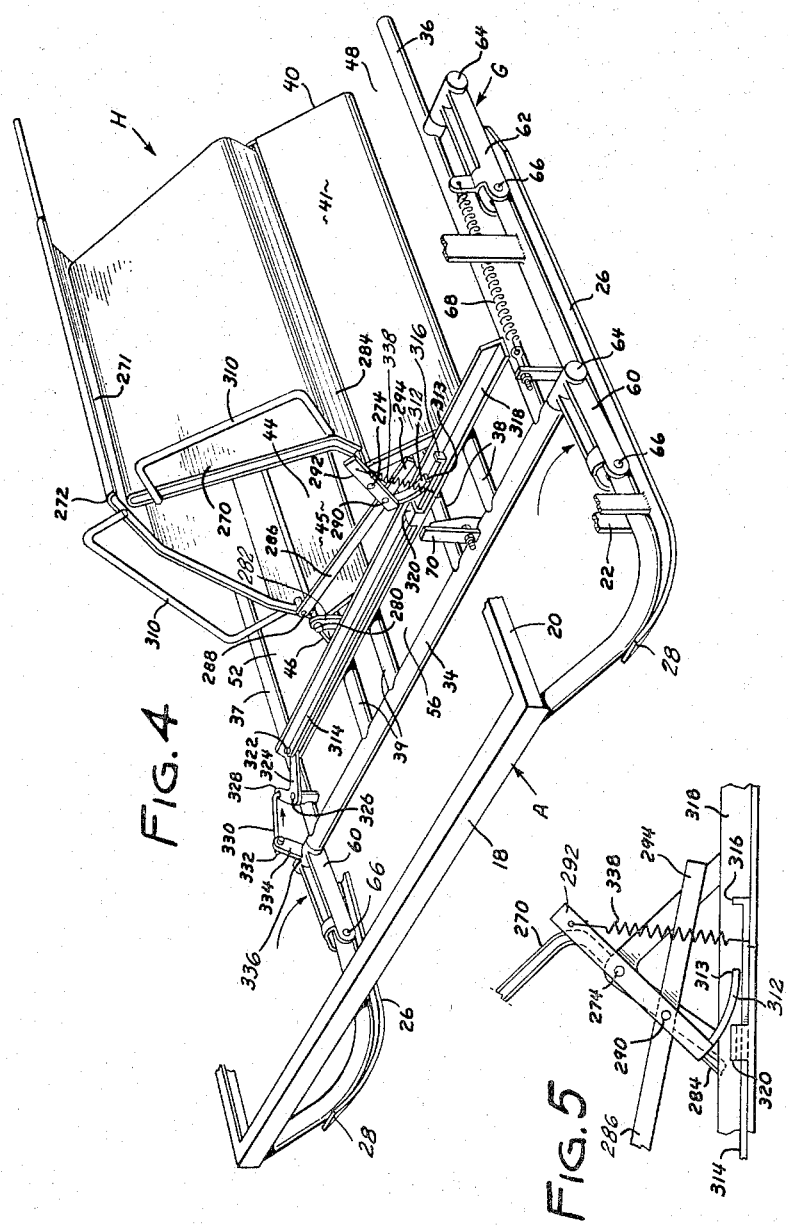

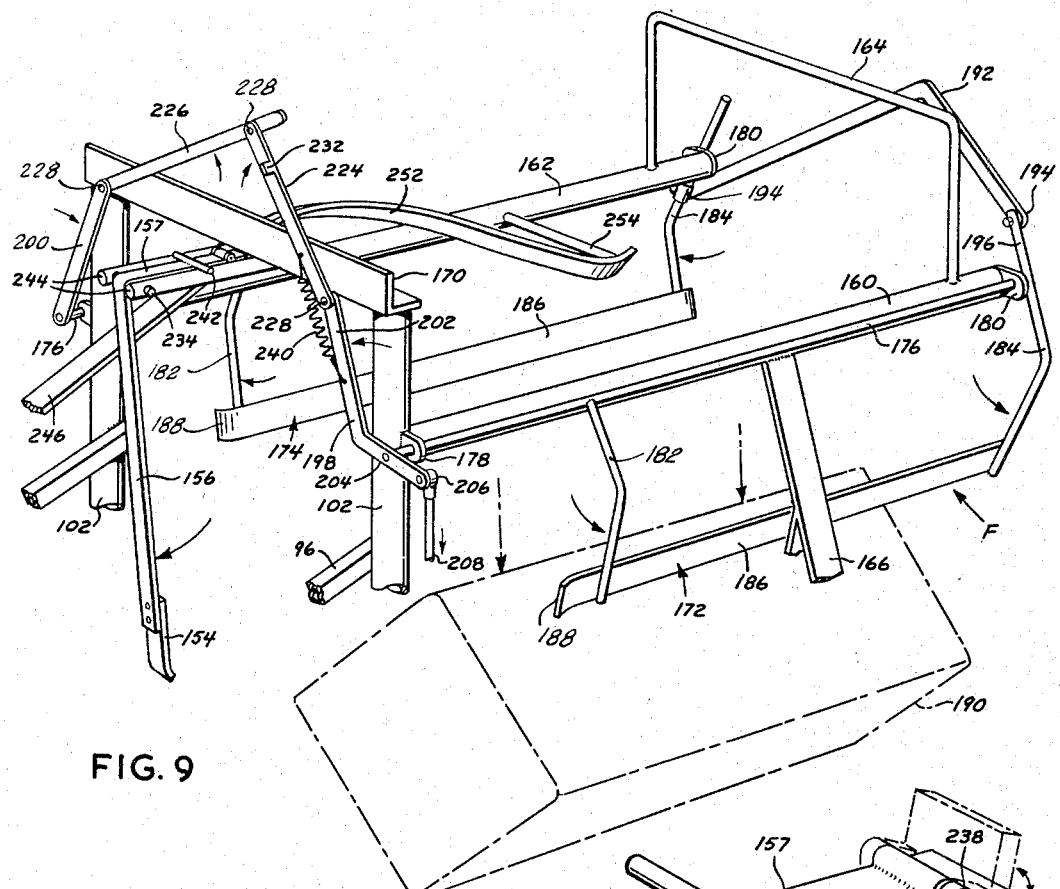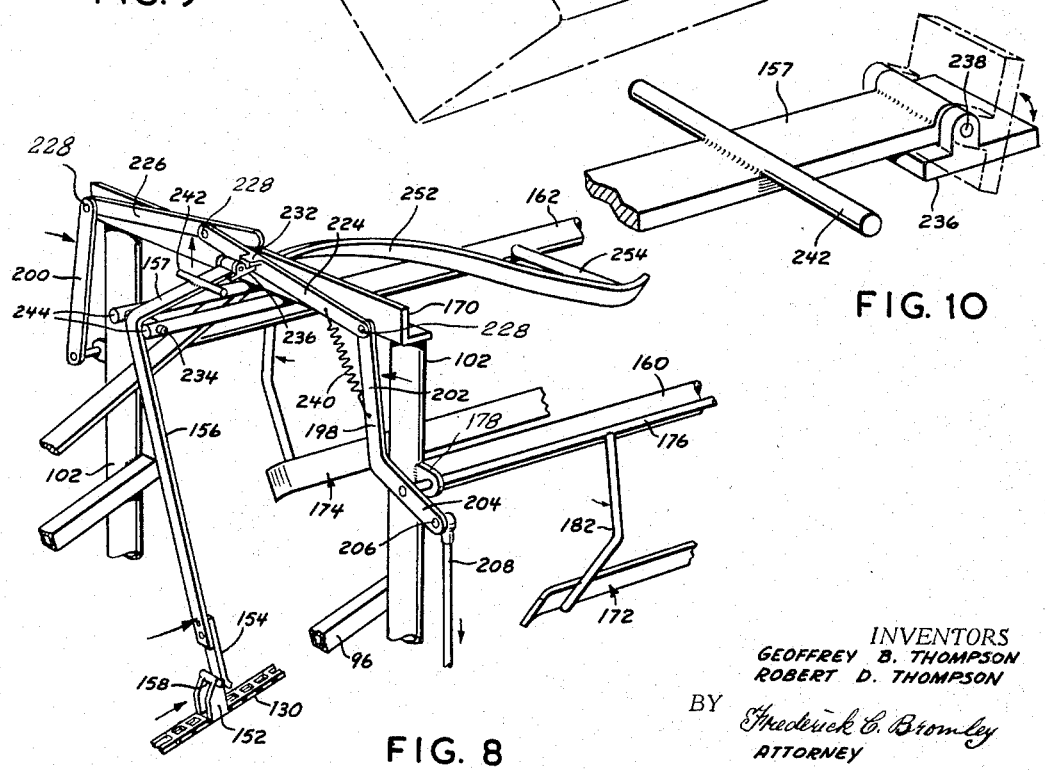

3,375,940
AUTOMATIC STOOKERS
Geoffrey B. Thompson, Whitby, Ontario, and Robert D. Thompson, Ajax, Ontario, Canada, assignors to The Kelvin-Thompson Company Limited, St. Mary's, Ontario, Canada, a corporation of Canada
Filed Dec. 21, 1964, Ser. No. 419,744
19 Claims. (Cl. 214—6)

ABSTRACT OF THE DISCLOSURE

Automatic bale stooker apparatus for use in conjunction with a baling machine including a ramp structure for conducting bales from the baling machine to a bale dropping assembly and including pusher means for positively feeding bales to the dropping assembly. The ramp structure also may include a flexible forward portion adapted to maintain a bale-conducting passage between the stooker apparatus and the baling machine irrespective of the relative angular movement between stooker and baler in making turns. The dropping assembly includes co-acting bale jaws which, in a closed position, receive bales and, in an open position, drop bales onto a stook forming platform disposed beneath the jaws. The platform is movable for discharge of a stook built up thereon.

---

The invention relates to hay bale stookers and has for its general object to provide a stooker which is entirely automatic in its operation and one which is eminently efficient and reliable in use.

A further object of the invention is to provide a stooker which will automatically build up six-baled stooks of consistent configuration and deposit them on the field while the machine is in motion, and regardless of any turns that may be made by the hauling baler incidental to the travel of the baler over the land with the stooker attached thereto. Still another object is to provide a stooker of this kind which is capable of dropping a completed stook even though it may be in the act of making a more or less sharp turn in conjunction with the baling machine; and which by virtue of a novel ramp structure will continue to receive bales from the baling machine while turns are being made on the field regardless of the degree to which the stooker may be required to turn with respect to the baling machine.

Still another important object of my invention is to provide in a stooker of the kind referred to a ramp structure having a conveyor apparatus for taking bales from the baling machine for building a stook, and devised for completely separating adjacent bales as they are conveyed to the stook erection means. It is most essential that adjacent bales be free of connection as by strands of hay, otherwise the bales may not be properly stacked in a stook. It frequently happens in the baling operation that bales become attached at adjacent ends by strands of hay. In order that an automatic stooker may operate efficiently it is necessary that the bales be entirely severed prior to their reaching the bale-building means. The severing means herein referred to is simple in operation and assures of a positive separation.

A still further aim of the invention is to provide an automatic stooker capable of handling bales of widely varying weight and regardless of whether the bales are loosely or tightly made or more or less broken.

A still further aim of the invention is to provide a stooker of the kind referred to by which stooks can be reliably deposited while the machine is traversing hillocky and bumpy ground.

A still further and important object of the invention is to provide in a stooker of this kind apparatus which will assure that the cut of the hay bale will be in a weather-protected position in the completed stook. Accordingly the bales are disposed in a completed stook so that either the cut side is in a down position or is covered by another bale. This desirable result is brought about by the bale-dropping means which disposes the bales in the desired stook formation on a lowering platform.

The foregoing objects and advantages of the invention are brought about in the novel construction and arrangement of the automatic stooker comprising a provision of novel hitch means on a main frame incorporating a novel ramp structure for conducting bales to a bale-dropping assembly and including a flexible forward portion for accommodating the relative angular movement between stooker and the baler in making turns and also including conveyor means for positively feeding bales to the dropping jaws assembly at a rate of travel greater than that at which the bales are discharged by the baler, whereby to assure of complete separation of adjacent bales. The structure further includes the novel arrangement of the bale-dropping assembly and tripping means therefor which is associated with a novel arrangement of an automatic counter for release of the lowering platform when a completed stook is built thereon.

Having related salient objects and advantages of the invention, subsidiary objects and advantages will appear from the ensuing specification and the accompanying drawings wherein a selective form of the invention is illustrated.

In the drawings:

FIG. 1 is a perspective view of an automatic stooker constructed in accordance with the invention but omitting for the sake of clarity a portion of the lowering platform with the stook-forming doors, and showing the engine for the endless conveyor displaced to one side of the machine so that it may be more discernible;

FIG. 2 is a further perspective view of the machine showing the lowering platform in its fully raised position with the stook-forming doors in open position for receiving a bale (indicated in phantom lines) and also showing the dropping jaws by which the bale is held for a release operation;

FIG. 3 is an enlarged fragmentary view of a portion of FIG. 2 showing one of the stook-forming doors with the actuating mechanism for the companion door;

FIG. 4 is a slightly enlarged view similar to FIG. 2 but showing the stook-forming doors in closed position with the lowering platform lowered as in depositing a stook on the ground;

FIG. 5 is an enlarged view similar to FIG. 3 but showing the stook-forming door in closed position and associated with an opening mechanism automatically operated by the raising of the lowering platform;

FIG. 8 is an enlarged perspective fragmentary view of the bale-dropping mechanism in its initial opening position as brought about by the automatic trip mechanism;

FIG. 9 is a similar view to FIG. 8 but is a more complete perspective view of the bale-dropping mechanism with the dropping jaws in the open position assumed in the dropping of a bale (depicted in phantom lines);

FIG. 10 is an enlarged detail of the upper pawl end of the trip lever of the tripping mechanism for the bale-dropping assembly;

Figures 13, 14, 15:
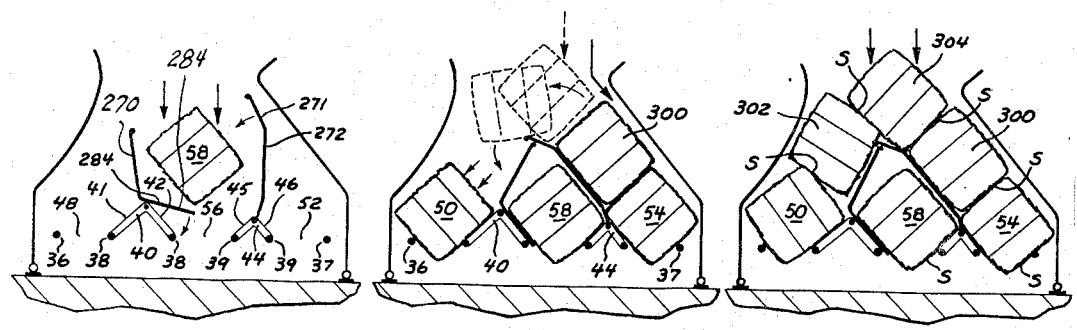

FIGS. 13 through 15 are diagrammatic views depicting the sequence in which bales are dropped in building the stook on the lowering platform. FIG. 13 shows how the first stook-forming bale is received between the enclosure-forming doors; FIG. 14 shows the doors closed and four bales loaded on the lowering platform with a fifth in the act of falling into position; and FIG. 15 shows the stook formation made up of the complement of six bales ready to be deposited on the ground.

The illustrated stooker is shown in the form in which it is presently manufactured for the market and comprises a portable main frame A, a ramp supporting sub-frame B, a ramp C with a flexible forward end and associated with a hitch assembly D, a conveyor mechanism E, a bale-dropping machinsm F, a lowering platform G, and a stook-forming mechanism H.

The main frame

The main frame is a mobile member which is hauled over the land by the the bailing machine to which the stooker is attached. The main frame; see FIG. 1, comprises a rear cross member 16 united with the front cross member 18 by end members 20. There members, which are of angle iron, are united as by welding to form a rectangular unit and are rigidly united at their rear corners to depending legs 22. The legs are braced by a cross bar 24 spaced below the rear cross member 16. The lower ends of the legs 22 are united with the forward parts of runners 26 whose upturned ends 28 are united with the front cross member 18. This structure forms a skid adapted to be towed over the land as by attachment to a baling machine in association with which it is used.

The discharge end of the delivery chamber of such a baling machine is represented at 30 in phantom lines and it will be understood that the stooker is intended to be used in association with any make of baler of which there are a number of different makes on the market, possessing a bale chamber through which bales of hay are rearwardly discharged as is well known in the art. It is desirable to provide the stooker with detachable wheels for use in hauling the machine over roadways, etc. and for this purpose the mobile main frame may be provided with bearings as at 32 receptive to stub shafts of auxiliary wheels (not shown). These wheels, of course, will be of a diameter such that they raise the runners off the ground. As will be obvious, wheels could be used in lieu of the runners for field work and therefore the term "mobile frame unit" is intended to include either runners or wheels.

The lowering platform

The runners 26 support the lowering platform G which is located to extend rearwardly from the rear cross member 16. The lowering platform comprises a skeleton platform comprising a front cross member 34, see FIG. 2, and 44, united with a series of rearwardly-directed coextensive bars arranged in spaced-apart relation. These bars include outer bars 36, 37, a pair of right-hand bars 38, and a pair of left-hand bars 39.

The pair of bars 38 jointly support and are made rigid with an inverted V plate 40 which provides divergent bale-supporting surfaces 41, 42. Likewise the pair of bars 39 are made rigid with and support an inverted V plate 44 having divergent bale-supporting surfaces 45, 46. Between the bar 36 and the adjacent V plate 40 there is provided an opening 48 for receiving the lower corner of a canted bale such as that indicated at 50 in FIGS. 14 and 15. Similarly there is provided an opening 52 between the bar 37 and the adjacent V plate 44 which is receptive to lower corner of a bale 54 as shown in FIGS. 14 and 15. Similarly there is an opening provided between the two V plates 40 and 44 as shown at 56 which is receptive to the lower corner of the bale 58. This skeleton platform structure is not new and will be dealt with later.

Front and rear bracket links 60, 62, respectively, are located at each side of the skeleton frame and are pivotally connected thereto at their upper ends as at 64. The bracket links have their lower ends pivoted at 66 to the corresponding runner 26. The sets of link brackets coact to support the skeleton frame for movement between the raised and lowered positions with substantially parallel movement, which is not new to such platforms for lowering a built up stook. The lower corners of the bottommost bales make contact with the ground in a depositing operation, as is known in the art.

In the raised position of the bale-supporting platform G it is held in abutment with the rear surface of the main frame A as by helical tension springs 68. A locking device serves to secure the bale-lowering platform in its normally raised attitude as shown in FIGS. 1 and 2. The forwardly disposed link brackets 60 are inclined rearwardly from their lower pivotal connections 66 in the normally raised position of the lowering platform G in order that the lowering platform will be self-lowering when loaded and released by the locking device. The rear link brackets 62 are desirably made slightly longer between their pivotal axes 64 and 66 in order that said lowering platform may have a forward downward slope which is desirable for ascending slopes on the field in order to guard against unwanted shifting of bales on the lowering platform.

The locking means for the lowering platform comprises an upstanding latch plate 70 which is rigid therewith and engageable with a lever latch 72 of a counting mechanism which will later be described in detail.

The hitch assembly

Figure 6:
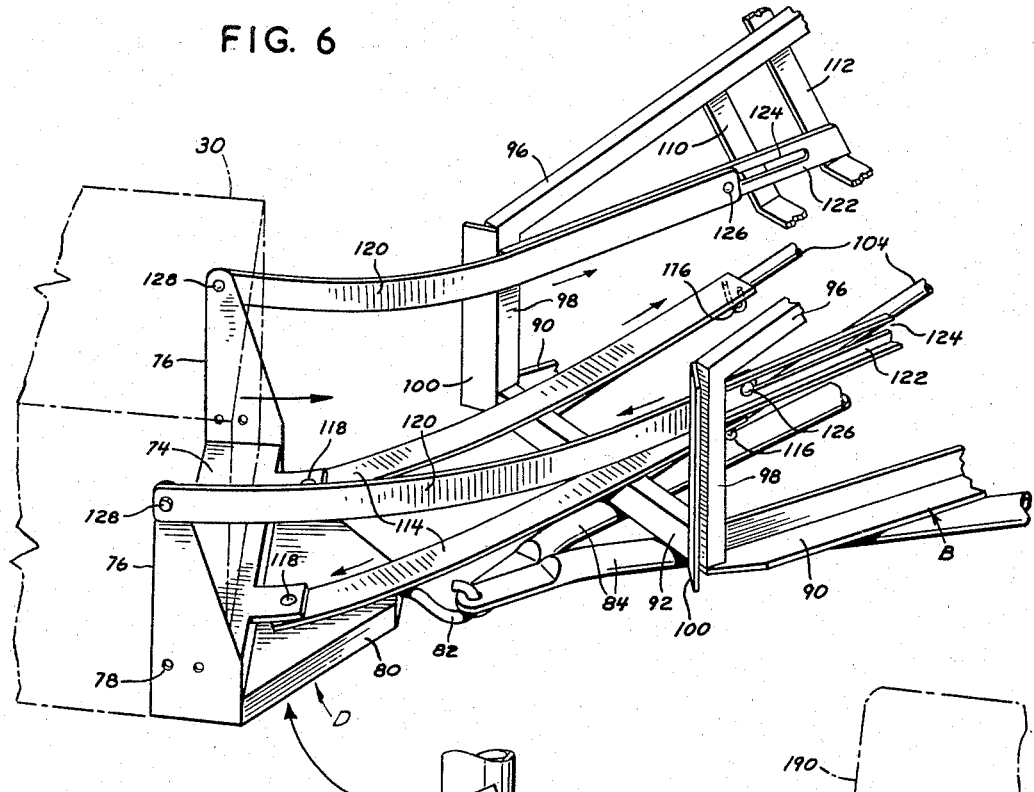
FIG. 6 is a considerably enlarged perspective view depicting the forward end of the hitch assembly and ramp mechanism connected to the rear of the bale-discharged chamber, of a bale-forming machine and showing how the forward portion of the ramp flexes when the forming machine turns at a sharp angle to the stooker apparatus.

The hitch assembly D; see FIGS. 1 and 6, comprises an apron 74 which is devised to be attached immediately beneath the mouth portion of the bale discharge chamber 30 of the baler and is secured thereto preferably by upstanding ears 76 which flank the bale chamber and are bolted thereto as by the provision of the bolt receiving holes 78. The attachment means is shown by way of example, but not of limitation. Rearwardly extending from the apron is a drawbar 80 having a rear terminal hook 82. The hook is engaged by the pierced ends of the converging tow-bars 84 which have their spread ends pivotally connected at 86 to the rear part of the main frame A as by the lugs 88. The tow-bars extend immediately beneath the front cross-member 18 and consequently the machine may not have undesirable forward tilting movement.

The hitch connection enables the stooker to be drawn with an attendant freedom to turn sharply and to tilt laterally relative to the baler as required in negotiating turns and traversing undulating ground.

The ramp-supporting sub-frame

The ramp-supporting sub-frame B; see FIGS. 1 and 6, is shown by way of preference as comprising spaced longitudinally extending side-members 90 tied together at the front and rear ends by cross-members 92 and 94 respectively. The rear cross member 94 is bolted to the rear cross member 16 of the main frame A and the side-members 90 are likewise secured to the front cross member 18 thereof. The sub-frame extends forwardly and terminates short of the converging ends of the tow-bars 84 and is suitably spaced from the baler hitch assembly D.

The ramp

The ramp C; see FIGS. 1 and 6, is designed to have its forward end in bale-receiving disposition with respect to the mouth of the bale discharge chamber 30 for guiding bales upwardly therefrom to an on the bale-dropping mechanism F. The main extent or rear section of the ramp is rigid with the main frame A and supported on the sub-frame B. The forward end of the ramp is made preferably flexible so that regardless of the relative angular disposition of the bale-forming machine and the stooker apparatus, bales can be guidedly conducted up the ramp to the bale-dropping mechanism which is an important feature of the invention.

The rearward rigid section of the ramp comprises side bale guides 96 which slope upwardly from the front upright supports 98 to which they are made fast. These upright members at their lower ends are made rigid with the corner portions of the sub-frame B and include the angled guide-plate 100. The upper ends of the side bale guides 96 are made fast with the frame standards 102 respectively which are rigidly supported on the rear cross member 16 of the main frame A. The rigid section of the ramp also includes the bottom guide plates 104 which are spaced apart and are upwardly inclined from the front cross-member 92 of the sub-frame B and extend to and slightly beyond the standards 102 where they are supported by the cross member 106 which is fixed to the standards 102. The cross member 106 is shown as provided with upright arm elements 108 which are made fast to the corresponding side bale guides 96.

The side bale guides 96 and the bottom guide plates 104 are further connected together at spaced points intermediate of their length by transverse connecting members which include the transverse cross members 110, 112, which are U-shaped members having horizontal portions rigid with the bottom guide plate and having upright portions secured to the side bale guides 96.

The flexible portion of the ramp includes the flexible extension guide plates 114 which form forward continuations of the bottom guide plates 104 and have rear end portions which overlap the respective bottom guide plates and are supported thereon for sliding movement therealong. These extension guide plates are desirably of spring steel and are loosely connected as at 116 to the bottom guide plates 104 so that any sliding movement may be accompanied by lateral sliding movement to accommodate turning of the bale-forming machine relative to the stooker apparatus as is provided for by the rear terminal hook connection 82. The front ends of the extension guide plates 114 are pivoted to the apron 74 of the baler hitch as at 118.

The side bale guides 96 are also provided with forward flexible extension plates 120 which are desirably of spring steel. The rear ends of these flexible side plates 120 have telescoping connections with the side portions of the ramp as by slotted plates 122 which are made fast with the respective front upright supports 98 and the aforesaid intermediate transverse cross members 110 and 112. Each of the slotted plates 122 is provided with an elongated slot 124 in which is slidably received a headed pin 126 carried by the rear end of the flexible extension plate 120 at that side of the ramp. The forward ends of the extension plates 120 are pivoted at 128 to the respective upstanding ear 76 of the baler hitch assembly.

According to this arrangement, it will be understood that as bales emerge from the mouth of the bale discharge chamber 30, they are received by the flexible frontal portion of the ramp comprising the extension plates 114 and 120 which guides them onto the fixed incline portion of the ramp for upward travel to the bale-dropping mechanism F. The distinctive feature of the ramp structure is that the bottom extension guide plates 114 swing laterally in any turning movement on the part of the baler, and the flexible extension plates 120 bend to accommodate any turning movement of the baler so that the ramp is operative regardless of whether the baler is travelling straight ahead or is making a turn as shown in FIG. 6.

The conveyor

Distinctive features of the ramp structure; see FIG. 1, are that it employs positive means for conveying bales upwardly thereof to the bale-dropping mechanism F and that the conveyor is devised to separate adjacent bales as they are fed up the ramp. The conveyor comprises an endless chain 130 trained over a lower sprocket 132 and an upper sprocket 134. The lower sprocket is the driver and has a power take-off connection with a source of motor power which, in the present instance, consists of a single cylinder gasoline engine 136 including a gas tank 138 and a speed reducer 140 which has an output shaft 142 connected to the lower sprocket 132. The lower sprocket 132 is shown as mounted in a hangar 144 located beneath the bottom guide plates 104. The engine assembly is mounted in the hangar 144 and to this end bolt holes 146 are provided in the speed reducer 140. This drive has been found to be satisfactory but could of course be modified within the scope of the invention.

Figure 7:
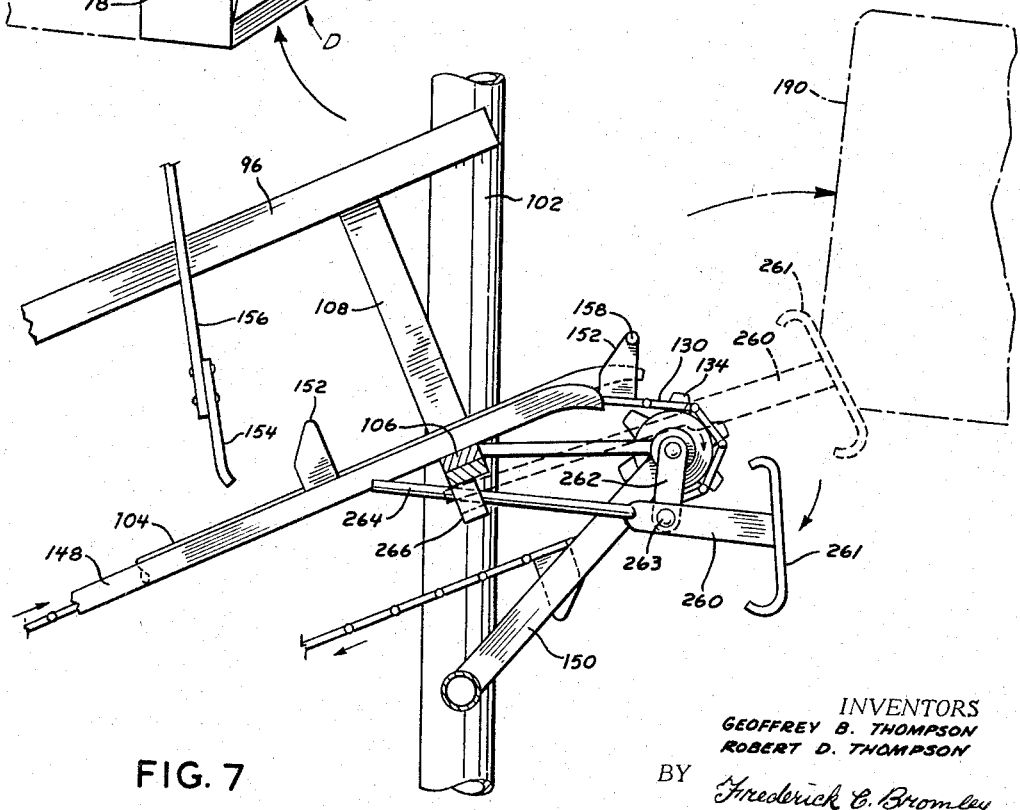
FIG. 7 is an enlarged side elevation of the delivery end of the ramp showing a bale pusher operated by the endless conveyor.

The upper reach of the chain is supported and guided in a channel member 148; see FIG. 7, extending between the sprockets and supported on the cross members 106 and 112. The upper sprocket 134 is supported on the frame standards 102 by a bracket 150.

Teeth or lugs 152 are provided on the chain at uniform intervals along the length thereof and project upwardly of the bottom guide plates 104 of the ramp in order to engage bales of hay and positively feed them upwardly to the bale-dropping mechanism. The teeth are in pairs of spaced members in order to allow the end 154 to trip latch 156 to pass therethrough. Certain of the pairs of teeth are bridged by a tripping element 158 as will be dealt with later; see FIG. 8.

The main frame A includes a pair of spaced rearwardly directed bars 160, 162; see FIGS. 1 and 9, which are horizontally arranged in spaced relation and each of which has its front end made fast to a frame standard 102 near the upper end thereof. The rear end of the bars 160, 162, are connected together by an overhead brace bar 164 and they are further supported toward their rear ends by upright bale guide supports 166, 168, which have their upper ends welded to or otherwise fastened to respective horizontal bars 160, 162, and have their lower ends likewise connected to the respective runners 26. The bale guide supports 166, 168, straddle the lowering platform G, and sufficient lateral clearance is provided to enable the platform to operate freely without interference with the bale guide supports.

This portion of the main frame A forms a part of the bale-dropping mechanism and includes a top cross-bar 170 of angle iron which rigidly joins together the upper ends of the standards 102.

The bale-dropping mechanism denoted at F; see FIGS. 1 and 9, includes a pair of bale-dropping jaws 172, 174, each of which includes a pintle rod 176 journalled in front and rear lugs 178, 180, the front lug being secured to corresponding standard 102 and the rear lug 180 being fastened to the rear end of the horizontal rod 160. The pintle bar 176 is made rigid with the front and rear arms 182, 184, which, in the normal closed position of the jaws, depend and have inturned lower end parts made fast to the jaw member 186 which is horizontally disposed and sloped inwardly and downwardly with respect to a transverse plane. The forward end of the horizontal jaw member 186 is flared outwardly as at 188 to coact with its companion in receiving a bale delivered by the conveyor. Such a bale is indicated in phantom lines at 190 in FIGS. 1 and 7.

From the immediately preceding description it will be understood that the bale-dropping jaws have relative to-and-fro swinging movement on their pintles. To maintain them in corresponding positions at all times, they are interconnected by an upwardly bent link bar 192 which is rearwardly disposed and has its ends pivotally connected at 194 to the rear jaw arms 184, the connection at one end being made by an extension part 196 beyond the pivotal axis afforded by the pintle rod 176, and the other connection 194 being made on the opposite side of the other pintle rod so that the jaw arms will have simultaneous closing and opening movements. One of the connections 194 may be made adjustable along the length of the respective jaw bar whereby to increase or decrease the radius of action relative to the fixed pivot on the other jaw. Accordingly the jaw with the adjustment can be swung away faster or slower in relation to the other jaw which tends to induce a desired twist in one direction or the other to the bale as it clears the jaws.

Figure 11:
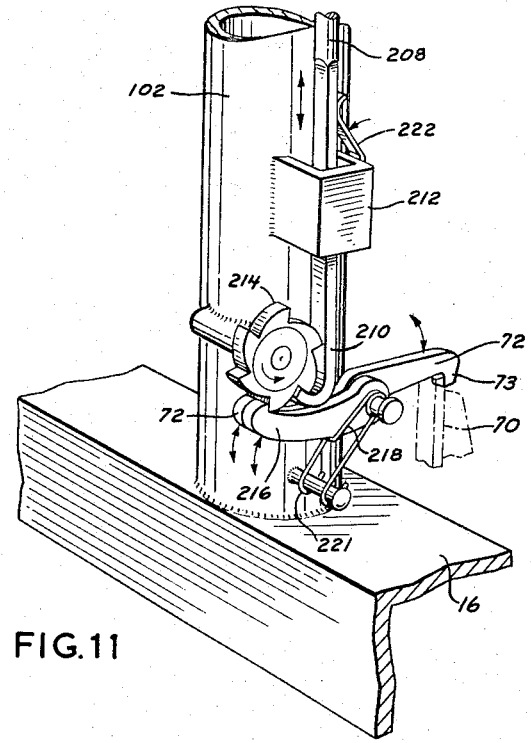
FIG. 11 is an enlarged perspective view of the counter-device for release of the lowering platform.
Figure 12:
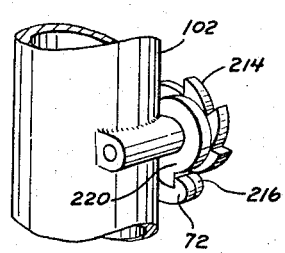
FIG. 12 is a detail showing the toothed counting wheel and the dog for effecting release of the lowering platform.

The bale-dropping mechanism further includes a trip-mechanism which retains the jaws in closed position and also functions to open the jaws for dropping a bale onto the lowering platform G. The trip mechanism comprises a lever 198; see FIGS. 1, 8 and 9, secured on the front end of the pintle rod 176 of the jaw 172, and a lever 200 likewise secured on the front end of the pintle rod 176 of the companion jaw 174. Lever 200 is erect in the normal closed position of the jaws; see FIGS. 1, and 8, and the other lever has an arm portion 202 which similarly is erect in the closed position of the jaws. Lever 198 includes an angular arm portion 204 which extends outwardly in the normal closed position of the jaws and is pivotally connected at 206 to a depending pawl bar 208 whose lower end terminates in a pawl element 210, see FIG. 11. The lower end of the pawl bar is loosely constrained in a guide box 212 which provides for limited to and fro movement of the pawl with respect to a ratchet counting wheel 214 pivotally supported on the adjacent standard 102. The ratchet wheel has six teeth and is retained against retrograde movement by a click 216 spring-pressed as at 218 to preclude retrograde movement of the ratchet counting wheel. At the inner side of the ratchet counting wheel, see FIG. 12, is a concentric single-toothed dog 220 which is made to turn with the ratchet counting wheel and is engaged by a latch-locking lever 72 whose latching end 73 is engaged with the latch plate 70 to lock the movable platform G in its raised position. The lever latch 72 is yieldably held in engaged position by a spring 221. A leaf spring 222 presses the pawl bar 208 into engagement with the ratchet counting wheel 214.

Now, it should be explained that each time the jaw-tripping mechanism is operated to release a bale, the outwardly extending arm portion 204 of the lever 198 is swung upwardly and this angular arm portion 204 exerts an upward pull on the pawl element 210, bar 208, thus causing the pawl to turn the ratchet counting wheel 214 a distance of one tooth. Consequently six tripping operations are required in order to cause the single tooth dog 220 to actuate the latch lever 72 in a releasing movement to unlock the latch plate 70 and allow the lowering platform G to descend with its load. After discharge of the load the lowering platform upon returning to its raised position under the influence of spring 68 is again locked by the latching mechanism including the latch plate 70 and lever latch 72. From this, it will be understood that, in the embodiment illustrated, six bales are required to be dropped onto the lowering platform G before the counting mechanism will operate to release the lowering platform for unloading the stook and depositing it on the ground.

Now, we will return to the trip mechanism of the dropping jaws which was recounted as having upright levers 198 and 200 connected to the aforesaid pintle rods 176 of the bale dropping jaws. Levers 198 and 200 are connected together at their upper ends by a toggle link assembly comprising the links 224, 226. The toggle links 224, 226, occupy an aligned position in the closed position of the jaws as shown in FIG. 1 and consequently the jaws are secured in closed position by this arrangement. As will be seen from FIGS. 8 and 10, on the toggle link 224 is a forwardly projecting lug 232 at a point removed from the pivotal connection 228 thereof. This lug coacts with the trip latch 156 described earlier, which terminates in the trip finger 154. Trip latch 156 is pivoted at 234 to swing in the plane of the conveyor chain 130 and its lower end is of a width to pass freely between the pairs of spaced teeth 152 which upstand from the conveyor chain and are attached to links thereof; see FIG. 1. Trip latch 156 has an upper end part 157 bent at a right-angle to extend inwardly to a point just short of the lug 232 where it is provided with latch finger 236 pivoted at 238; see FIGS. 9 and 10.

The latch finger is arranged so that its projecting end, which lies beneath lug 232, may swing upwardly but not downwardly with the result that when the finger end 154 of the trip latch 156 is swung in the direction in which the bales travel on the conveyor, the upper end part 157 is swung upwardly to cause the latch finger 236 to engage the lug 232 and raise the inner end of the toggle links a distance sufficient to unlock or break the toggle. Consequently the weight of a bale resting on the jaws spreads the jaws to their open positions, which allows the bale to drop onto the movable lowering platform G.

FIG. 8 illustrates the tripping action and FIG. 9 shows the subsequent opening of the jaws with the bale released. A spring 240 functions to close the jaws and to reset the toggle links in locked dead centre attitude. The latch finger 236 will swing upwardly, as shown, by phantom lines in FIG. 10, to allow the trip latch 156 to return to its normal position after the toggle links are in their reset attitude for a recurrent operation. A stop member 242 limits the downward swing of the portion 157 of the latch 156 in its return movement; see FIG. 9. The trip latch 156 is pivotally supported by means of the frame pieces 244 which are fastened to the cross bar 170 and the stop member 242 will engage thereon; see FIGS. 1 and 9.

From the foregoing it will be manifest that as the bale is caused to travel upwardly on the ramp under the influence of the conveyor teeth it is received in the bale-dropping jaws 172 and 174. As seen in FIG. 1, there is provided over the conveyor an inclined bale guide 246 having a flared lower end 248 which is supported on the ramp as by the supporting element 250. The upper end of this overhead bale guide is attached to cross-bar 170 of the frame and there is a rear continuation bale guide 252; see FIGS. 1, 8 and 9, disposed over the bale-dropping jaws with its forward end supported on the cross-bar 170 and its rear end supported by a horizontal bar 162 as by the bracket 254.

The inclined bale guide 246 helps to keep a bale down on the conveyor teeth and portion 252 assists in inducing twist to the bale as it enters the bale jaws. Adjustment provisions may be made for up and down adjustment to induce more or less twist and to give more or less clearance over the conveyor teeth. The rear twisted section 252 of the bale guide assists to a greater extent in imparting twist to the bale as it is received in the jaws and the arrangement is such that a bale is turned to one side as it leaves the ramp and is received by the jaws so that it is held by the jaws at an acute angle with a corner portion lowermost and it is dropped in this position.

It should be particularly noted that the rear portion 252 of the top bale guard which is overhead of the bale-dropping jaws is twisted uniformly throughout its length from its forward end to its rear end and this twist coacts in turning the bale to the desired angular disposition as it is received by the jaws whereas the inclined portion of the top bale guide which overlies the conveyor helps to keep the bales down on the conveyor lugs or teeth as they are moved toward the dropping jaws.

The pairs of spaced teeth 152 which do not have a connecting trip bridge 158 receive the terminal trip finger 154 of the trip latch 156 and allow it to pass through freely. However, the pairs of teeth which are provided with the tripping bridges 158 make actuating contact with the trip finger 154 of the trip latch 156 and swing it forwardly in passing thereunder. The trip latch, therefore, is caused to trip the toggle links by raising them away from dead centre position to break the toggle. When no bale is held by the jaws they do not spread in an opening movement when the toggle links are tripped off centre position and, therefore, the jaws merely close from their partially open position and the toggle links swing back to their dead centre locking position under the assistance of the spring 240.

However, when a bale is present in the jaws and the trip latch 156 is actuated either by the next bale fed up the ramp, or by contact with trip bridge 158 on a pair of spaced teeth, the unlocking of the toggle links permit the weight of the bale to spread the jaws allowing the bale to drop clear. It will be evident that the trip latch is free to ride over a bale ascending the ramp and when clear of it, drops back into normal attitude for a recurrent operation. By providing the conveyor chain with a number of the trip bridges 158 it assures that a bale will be quickly dropped by the jaws well in advance of the approaching next bale, and the mechanism has been found to work smoothly and efficiently without interference.

Desirably a pusher device is employed in order to assure that as a bale is received between the jaws it will be forwarded clear of the conveyor chain, which aids the twisting of the bale into the inclined position in which it is dropped onto the lowering platform. This pusher device is timed relative to the bale-forwarding teeth on the chain and remains in phase at all times.

The pusher device is best shown in FIG. 7 and comprises a pusher rod 260 having a head 261 and connected to a crank arm 262 by a pin 263. The crank arm is carried by and moves with the upper sprocket 134. The pusher rod has a tail end 264 which is loosely confined for endwise movement in an apertured guide 266. In the rotation of sprocket 134 the pusher rod 260 is operated with a pitman action, see phantom lines of FIG. 7, and the trailing end of a bale on leaving the conveyor chain is engaged by the head 261 which imparts to it an abrupt push thus assuring that the bale will be advanced well clear of the conveyor and completely stowed in the jaws ready to be dropped. A distinctive feature of the pusher device is that it also assures that a bale will be properly turned to the desired angle as it is fully received in the jaw cavity of the bale-dropping assembly.

In building a stook it is most important that the cut of each hay bale is in a protected disposition so that optimum protection is obtained from the weather. With a view to obtaining this protection, the bales of a stook are positioned so that either the "cut" side is in a "down" position or is covered by another bale. In FIG. 15 there is shown diagrammatically a complete stook formation in which the component bales are stacked to bring about this weather protection, and in this view the "cut" side of the several bales is denoted at S.

It has been found that this desirable result may be satisfactorily obtained by employing stook-forming doors which enable bales to slide easily over one another. This door mechanism is illustrated and will now be described although it does not per se form a part of the present invention since other expedients could conceivably be employed to obtain a similar result. This stook-forming door mechanism is generally denoted at H and comprises a right-hand door 270 and a left-hand door 272, see FIG. 2. The doors are sheet metal members suitably reinforced, one of which extends upwardly from the crest of the V-plate 40 and the other is similarly directed from the V-plate 44.

The door 270 is hinged substantially along the crest of V-plate 40 at its lower edge portion by means of a pintle 274 carried by brackets on this V-plate. The door 272 is similarly hinged substantially along the crest of V-plate 44 by a pintle 280 in brackets on the V-plate 44 as at 282. This hinged arrangement enables the doors to swing to and away from each other. The door 270 has a right-angular extension at its lower edge portion which extends inwardly and constitutes a trip plate 284. In the closed position of door 270 the trip plate 284 abuts the inner sloping face 42 of the V-plate 40 and acts as a limiting stop to retain the door in an inwardly inclined position in which it slopes towards the companion door, see FIG. 14.

The companion door 272 is coupled by a link rod 286 to door 270, the connection being such as to cause the doors to open and close simultaneously. The link rod 286 is pivoted at 288 to the door 272 and pivoted at 290 to a radial arm 292 rigid with the inner end of the pintle 274, so as to be rigid with the door 270, see FIG. 5. This end of the link rod 286 has a tail piece 294 which comes into abutment with the pintle 274 as the door 270 is swung to its "open" position, and thus limits the outward swing of this door. Since the other door is simultaneously swung to "open" position by the link rod 286, it has limited opening movement as indicated in FIG. 2.

Door 272 is made a greater width than the companion door 270 in order that it may overlap that door in closed position as shown in FIGS. 14 and 15. The top overlap element of door 272 is shown at 271.

The doors initially are in their "open" positions in the building of a stook on the movable platform and when the first bale is dropped in a stooking operation it falls between the doors as indicated in FIG. 13. Its lower corner portion strikes the trip plate 284 thus depressing it and effecting the closing of the doors by reason of the link rod connection 286 between the doors to the position shown in FIG. 14. This first bale denoted at 58 in FIGS. 13–15 is housed within the folded doors with its lower sides cradled between the V-plates 40 and 44 and its lower corner projecting downwardly therefrom for contact with the ground. The next bale that is dropped strikes the overlapping top portion 271 of door 272 and slides down this door to come to rest between the outer bar 37 and the adjacent face 46 of the V-plate 44 with its lower corner portion projecting downwardly therefrom. This bale is denoted at 54 in FIGS. 14 and 15. In the dropping of a subsequent bale it is guided to come to rest against the door 272 and the bale 54. This bale is designated 300 in FIGS. 14 and 15. When the next bale is dropped it comes into contact with bale 300 and the upper portion 271 of door 272, rolls down alongside of door 270 and comes to rest between the outer bar 36 and the adjacent V-plate 40 with its lower corner portion projecting downwardly. This bale is designated 50 in FIGS. 14 and 15. When the fifth bale 302 is dropped it similarly is caused to roll over to the right-hand side of the closed doors (left-hand side of view from rear of FIGS. 14 and 15) and comes to rest on bale 50, and the sixth bale designated 304 in FIG. 15 when dropped comes to rest upon bales 300, 302, thus completing the stook.

Now it has been mentioned that when the sixth bale is dropped the lowering platform is unlocked by the latch lever 72 and consequently the lowering platform is allowed to descend in a lowering operation to deposit the stook on the field. As the stooker is pulled away by the baler, the lowering platform is raised by the spring 68 and again locked for repeat operation.

It will be noted that lateral blade guides 306 and 308; see FIGS. 1 and 2, are carried by bale guide supports 166, 168, respectively, to assist in the proper stook formation of the bales as they are dropped by the jaws.

Stop bars 310 are provided on the doors 270, 272, at the inner ends thereof and means are provided to automatically open the doors in the raising of the lowering platform subsequent to a stook-depositing operation.

The door opening mechanism, see FIGS. 2–5, comprises an outwardly curved finger 312 which is rigidly carried by the lower end of the radial arm 292 and overlies a pull rod 314. The distal end 313 of the finger 312 is stationed in the path of a strike plate 316 upstanding from an adjacent end of said pull rod 314 in the closed position of said doors, said pull rod extends transversely of the lowering platform G in advance of the doors and is supported upon an angle bar 318 upon which it is endwise slidable. Said angle bar is secured to the bars 36, 37, 38 and 39, or at least two of them. Said pull rod is guidably constrained on said angle bar as by a guide bearing 320.

The remote end of said pull rod 314 is pivoted at 322 to one arm of a bellcrank 324 which is pivoted at 326 on the bar 37 of the lowering platform G. The other arm 328 of the bellcrank is pivoted to a connecting rod 330 which is swively connected at 332 to an arm 334 radially projecting from the axis of the front cross member 34 of the lowering platform and made rigid with the adjacent end 336 of the bracket link bar 60 at that side of the machine.

Accordingly, the linkage connection with said pull rod 314 causes the pull rod to slide toward the left-hand side of the machine as the lowering platform is raised after deposit of a load with the consequence that the strike plate 316 engages the end 313 of the finger 312 and moves the finger inwardly a distance sufficient to open the doors, the opening being assisted by a spring 338.

The door-opening mechanism does not hamper the closing action of the door since the strike plate 316 travels away from the curved finger 312 in the closing of the doors.

What I claim is:

1. A bale stooker apparatus comprising in combination a main frame, a ramp supported thereon having a lower bale receiving end and an upper bale discharge end, a conveyor mechanism for feeding bales up said ramp for discharge therefrom at the upper end thereof, a bale-dropping mechanism supported on said main frame beyond said discharge end of said ramp for dropping bales clear thereof, said bale-dropping mechanism having spaced horizontally disposed co-acting bale-jaws aligned with said ramp, said jaws having closed positions in which they jointly receive a bale discharged from said ramp and having open positions to which they are spread for dropping a bale, means for causing said jaws to move in unison, locking means for releasably securing said jaws in closed position including trip means for release of said jaws, a pusher device associated with said conveyor for forwarding a bale clear of the conveyor as it enters the bale-dropping mechanism, a stook-forming platform disposed beneath said bale-dropping mechanism and movable for discharge of a stook built up thereon, and counting means for bringing about a stook discharge operation of said stook-forming platform when a stook is built up thereon.

2. The stooker apparatus of claim 1, wherein said main frame is supported on runners extending rearwardly thereof and serving to also support said stook-forming platform, wherein said stook-forming platform is a lowering platform which is supported on the rearwardly extending portions of said runners by means of front and rear bracket links pivotally connected to both the runners and the platform, said rear bracket links being longer between their pivotal axes than said front bracket links whereby said lowering platform has a forward downward slope relative to the runners.

3. The stooker apparatus of claim 1, wherein said co-acting bale jaws have horizontally extending jaw members sloped inwardly in opposed relation to jointly support a bale turned to one side for dropping with a corner lowermost and including a top bale guide means having a portion overhead of said bale-dropping mechanism for assisting in turning a bale to one side so that it will be held in this attitude in said bale jaws with a corner portion lowermost preparatory to dropping.

4. The stooker apparatus of claim 3, wherein said top bale guide has a front portion which is substantially a continuation of said rear portion and which overlies said ramp to assist in conveying of a bale to the bale-dropping mechanism.

5. The stooker apparatus of claim 1, wherein said stook-forming platform has a lowering action for depositing a built up stook on the ground and is locked in raised position by locking means, said locking means comprising a spring-loaded latch lever pivotally mounted on said main frame and having latching engagement with a latch plate on said platform, and wherein a counting device is associated with said locking means and with said bale-dropping means and is operable to release said locking means when a pre-determined number of bales have been dropped onto said platform to form a stook, said counting device including a ratchet wheel mounted on said main frame and having teeth corresponding in number to the bales to be dropped onto the platform to build a stook, a single-tooth dog rotatable with said ratchet wheel for unlatching said latch lever when said ratchet wheel makes a complete turn, and means for advancing said ratchet wheel one tooth each time a bale is dropped onto said platform.

6. The apparatus of claim 5, wherein said means for advancing the ratchet wheel comprises a pawl bar reciprocably mounted for engaging the teeth of said ratchet wheel and having a connection with a jaw of said bale-dropping mechanism for receiving a reciprocable movement with each dropping of a bale.

7. The apparatus of claim 6, wherein said jaws are pivotally mounted, and in which one of the jaws has an arm radially extending from its pivotal axis and pivoted to said pawl bar.

8. The stooker apparatus as claimed in claim 1 in which said stook-forming platform comprises divergent pairs of bale-supporting surfaces for orienting three bales thereon in a lower row of a stook to subsequently be deposited, and door members respectively pivoted on the crest of each of the respective divergent pairs of support surfaces, said door members including portions for arranging a pyramid of three bales on the lower row of three bales to form a six-bale stook.

9. The stooker apparatus as claimed in claim 8 in which one of said door members includes a lower, angular extension comprising a trip plate, the other of said door members having a width greater than that of said first-mentioned door member and including an upper portion for overlapping said first-mentioned door member.

10. The stooker apparatus of claim 1, wherein said pusher device has a pusher head functionable with a to and fro motion for acting on the trailing end of a bale as it leaves the conveyor.

11. The stooker apparatus of claim 10, wherein said pusher device includes means for causing said pusher head to function with an attendant up and down movement.

12. The stooker apparatus of claim 10, wherein said pusher head is carried by a pusher rod operated by a crank located at the forward end of said conveyor and driven concurrently therewith, and wherein said pusher rod has a tail element guidably constrained.

13. The stooker apparatus of claim 1, wherein said trip means includes a latch lever devised with a tripping action and which normally occupies an obstructing position and which when tripped is operable to release said locking means so that the jaws of said bale-dropping mechanism may open under the influence of a bale held therein.

14. The stooker apparatus of claim 13, wherein said latch lever depends from a pivotal support into the path of movement of a tripping element carried by a chain which forms a part of said conveyor mechanism in order that it may receive a tripping action when contacted by said tripping element.

15. The stooker apparatus of claim 13, wherein said latch lever depends from a pivotal support into the path of travel of a bale ascending said ramp in order that it may receive a tripping action when contacted by a bale.

16. The stooker apparatus of claim 13, wherein said jaws of the bale-dropping mechanism are pivotally supported, and wherein said trip mechanism includes parallel levers rigid with the pivotal connections of said jaws and connected together by a toggle link assembly which in locked position secures said jaws in closed position, said latch lever functioning in a tripping action to unlock said toggle link assembly.

17. The stooker apparatus of claim 16, wherein said toggle link assembly comprises a pair of links pivotally connected together and likewise connected to said parallel levers, said links normally biased to an aligned position by spring means in which said jaws are held in closed position, and wherein said latch lever is pivotally supported and supplied with a bent part terminating in a latch finger disposed under a trip lug on one of said links to bring about said tripping action.

18. A bale stooker apparatus comprising a mobile frame; a stook-forming and depositing platform mounted on said frame; a towing connection for attaching said frame to the bale discharge chamber of a baler machine; ramp means supported on said frame for receiving bales from the bale discharge chamber and for delivering them to the stook-forming and depositing platform; a flexible front end portion on said ramp means having resilient extension guide plates endwise slidable on relatively rigid side portions of the ramp means and pivotally connected to said bale discharge chamber, and resilient bottom guide plates having an extensive and swingable connection with a relatively rigid bottom portion of the ramp means and pivotally connected to said bale discharge chamber whereby a bale-conducting passage is maintained between the stooker apparatus and the baling machine at all times irrespective of the turning of the baling machine away from a straight course in the operation of the stooker.

19. The stooker apparatus of claim 18, wherein a baler hitch is secured to said bale-discharge chamber and serves to pivotally connect the said resilient extension guide plates and the said resilient bottom guide plates to the said baler machine, and wherein said towing connection includes tow members forwardly extending from said mobile frame and having a swivel connection with said baler hitch.

References Cited
UNITED STATES PATENTS

| | | | |
|---|---|---|---|
| 2,740,250 | 4/1956 | Olson et al. | 214—6 |
| 3,080,071 | 3/1963 | Pratt et al. | 214—6 |
| 3,095,961 | 7/1963 | Hollyday | 198—128 |
| 3,158,270 | 11/1964 | Prentice | 214—6 |
| 3,223,253 | 12/1965 | Garbe et al. | 214—6 |
| 2,655,254 | 10/1953 | Baechli | 198—109 XR |
| 3,308,971 | 3/1967 | Sinden et al. | 214—42 XR |

FOREIGN PATENTS 789,568   1/1958   Great Britain.

GERALD M. FORLENZA, *Primary Examiner.*

HUGO O. SCHULZ, A. J. MAKAY, *Examiners.*

J. E. OLDS, *Assistant Examiner.*